US008219624B2

(12) United States Patent
Haynes et al.

(10) Patent No.: US 8,219,624 B2
(45) Date of Patent: Jul. 10, 2012

(54) SYSTEM, METHOD, AND APPARATUS FOR ELECTRONIC COMMUNICATION INITIATION CONTINGENT ON BUSYNESS

(75) Inventors: Thomas R. Haynes, Apex, NC (US); Lin Sun, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 600 days.

(21) Appl. No.: 12/117,458

(22) Filed: May 8, 2008

(65) Prior Publication Data

US 2009/0282138 A1    Nov. 12, 2009

(51) Int. Cl.
G06F 15/16    (2006.01)
(52) U.S. Cl. .................................. 709/206; 709/207
(58) Field of Classification Search .................. 709/206, 709/207
See application file for complete search history.

(56) References Cited

U.S. PATENT DOCUMENTS

| | | | | |
|---|---|---|---|---|
| 6,064,974 | A * | 5/2000 | Broekhuijsen | 705/8 |
| 6,631,405 | B1 * | 10/2003 | Kobata | 709/219 |
| 6,757,530 | B2 * | 6/2004 | Rouse et al. | 455/412.1 |
| 6,757,722 | B2 * | 6/2004 | Lonnfors et al. | 709/220 |
| 7,100,116 | B1 | 8/2006 | Shafrir et al. | |
| 7,529,683 | B2 * | 5/2009 | Horvitz et al. | 705/1 |
| 7,634,528 | B2 * | 12/2009 | Horvitz et al. | 709/200 |
| 7,653,693 | B2 * | 1/2010 | Heikes et al. | 709/206 |
| 7,677,436 | B2 * | 3/2010 | Ohno et al. | 235/375 |
| 7,688,820 | B2 * | 3/2010 | Forte et al. | 370/389 |
| 7,711,815 | B2 * | 5/2010 | Garg et al. | 709/224 |
| 7,752,253 | B2 * | 7/2010 | Manion et al. | 709/200 |
| 7,822,761 | B2 * | 10/2010 | Kussmaul et al. | 707/759 |
| 7,958,144 | B2 * | 6/2011 | Shoemaker et al. | 707/781 |
| 2004/0255015 | A1 | 12/2004 | Fitzpatrick et al. | |
| 2005/0182644 | A1 * | 8/2005 | Douvikas et al. | 705/1 |
| 2008/0052389 | A1 * | 2/2008 | George et al. | 709/224 |
| 2008/0313024 | A1 * | 12/2008 | Kunichika et al. | 705/11 |
| 2009/0018899 | A1 * | 1/2009 | Ogushi et al. | 705/11 |

OTHER PUBLICATIONS

Wikipedia, Presence Information, pp. 1-3, available at http://en.wikipedia.org/wiki/Presence_information, last visited May 8, 2008.

* cited by examiner

*Primary Examiner* — Kristie Shingles
(74) *Attorney, Agent, or Firm* — Jeffrey T. Holman

(57) ABSTRACT

An apparatus, system, and method for electronic communication initiation contingent on busyness. The method includes receiving a request from a requester to contact a user. The requested contact includes a request to engage in electronic communication. The method also includes determining a busyness of the user. The busyness is determined by accessing a quantity of active contact related tasks for the user. The method also includes comparing the busyness of the user to a condition. The condition is a complex condition having threshold levels for a plurality of contact related tasks. The method also includes contacting the user in response to satisfaction of the condition.

20 Claims, 7 Drawing Sheets

SYSTEM, METHOD, AND APPARATUS FOR ELECTRONIC COMMUNICATION INITIATION CONTINGENT ON BUSYNESS

BACKGROUND

Modern communication systems have dramatically increased the avenues for people to communicate with other people. These communication systems, including telephones, e-mail, and text chat, provide rapid interaction and can improve efficiency when the person being contacted is not too busy to participate in a conversation.

The increase in types of communication has, in many cases, also increased the busyness of users. It is not uncommon for the average office worker to be actively text chatting in several windows, have a stack of unread e-mails awaiting responses, and still need to accomplish actual work.

When the person being contacted is busy, requests to initiate a conversation can be an unwelcome distraction. These requests may be ignored by the busy user, leaving the requester uncertain as to why the user is not responsive, and whether a response may be forthcoming.

SUMMARY

Embodiments of a method are described. In one embodiment, the method is a method for electronic communication initiation contingent on busyness. One embodiment of the method includes receiving a request from a requester to contact a user. The requested contact includes a request to engage in electronic communication. The method also includes determining a busyness of the user. The busyness is determined by accessing a quantity of active contact related tasks for the user. The method also includes comparing the busyness of the user to a condition. The condition is a complex condition having threshold levels for a plurality of contact related tasks. The method also includes contacting the user in response to satisfaction of the condition. Other embodiments of the method are also described.

Embodiments of an apparatus are also described. In one embodiment, the apparatus is an apparatus for electronic communication initiation contingent on busyness. In one embodiment, the apparatus includes a request manager and a contact manager. The request manager receives a conditional request from a requestor communication server to contact a user based on satisfaction of a complex condition having threshold levels for a plurality of contact related tasks. The contact manager contacts the user in response to satisfaction of the complex condition relative to a busyness of the user. The busyness of the user is indicative of current communication activity levels of the user for the plurality of contact related tasks Other aspects and advantages of embodiments of the present invention will become apparent from the following detailed description, taken in conjunction with the accompanying drawings, illustrated by way of example of the principles of the invention.

BRIEF DESCRIPTION OF THE SEVERAL VIEWS OF THE DRAWINGS

Throughout the description, similar reference numbers may be used to identify similar elements.

DETAILED DESCRIPTION

In the following description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

While many embodiments are described herein, at least some of the described embodiments determine the busyness of a user and initiate a contact with the user contingent on the busyness of the user meeting a condition. In general, many of the embodiments described involve determining the busyness of the user by determining a volume and/or type of current interactions of the user with various communications services. The volume and/or type of interaction may be referred to as the "busyness" of the user. A rule, or set of rules, also referred to as a "condition," may be created that identify a threshold level of busyness of the user. The rule or rules may be established and/or applied based on preferences of the requester and/or the user.

In some embodiments, the condition is compared to the busyness to determine if contact should be initiated. If user's threshold busyness level is exceeded, incoming communications may be rejected. In addition to rejecting the incoming communications, or as an alternative to rejecting the incoming communications, the requester may be notified that the user has a busyness level that may affect the timeliness of a response to the requested communication. The requester also may be provided with some indication of the busyness level of the user.

Figure 1:
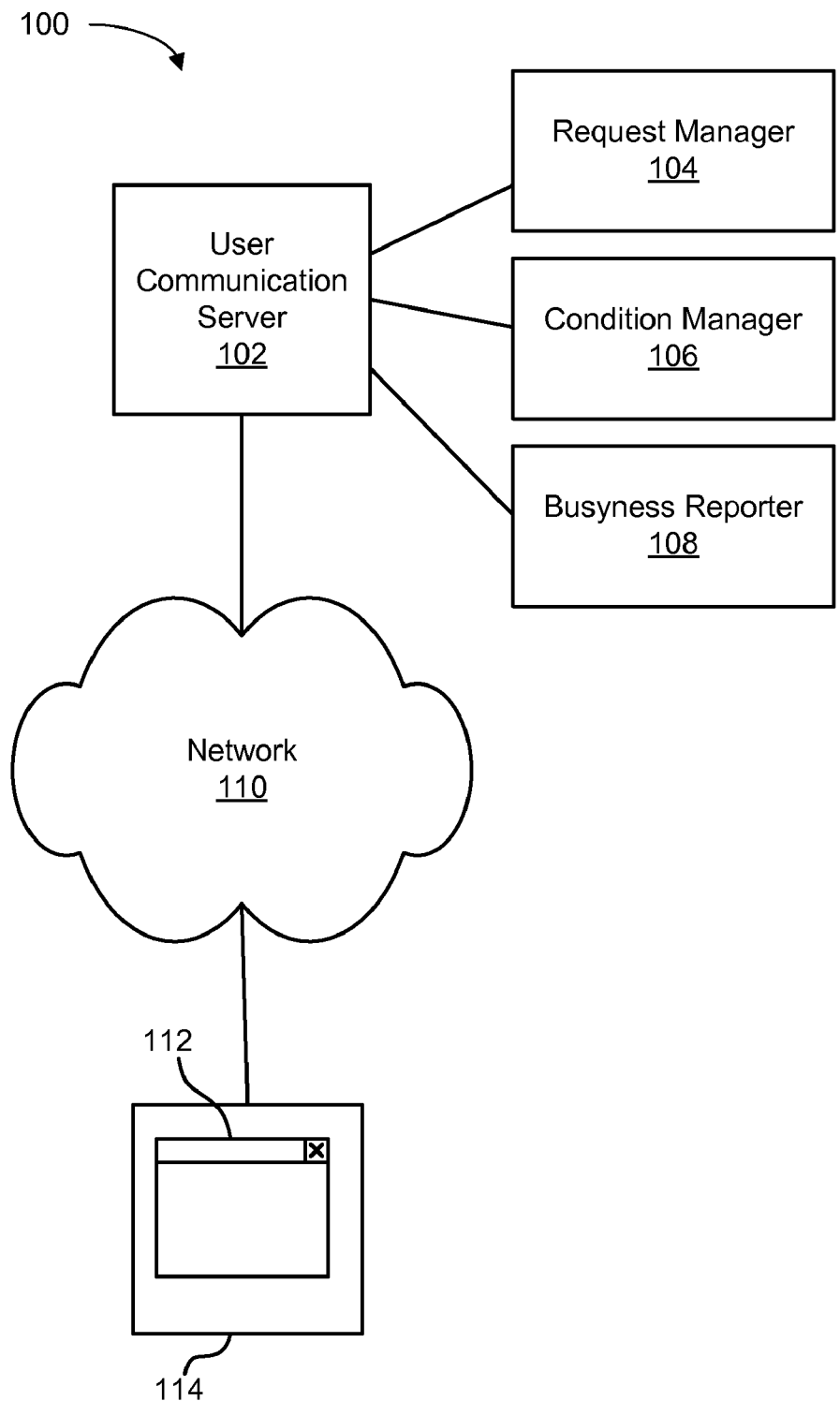
FIG. 1 depicts a schematic diagram of one embodiment of a system for electronic communication initiation contingent on busyness.

FIG. 1 depicts a schematic diagram of one embodiment of a system 100 for electronic communication initiation contingent on busyness. The system 100 includes a user communication server 102, a request manager 104, a condition manager 106, a busyness reporter 108, and a communication client application 112. The system 100 initiates a communication session with a user contingent on a busyness of the user meeting a condition.

The user communication server 102, in one embodiment, provides a communication service for the user. The user communication server 102, in certain embodiments, communicates with the communication client application 112. The communication service may be any type of communication service including text chat, e-mail, telephone calls, voice chat, meeting scheduling, or another communications service.

In one embodiment, the communication client application 112 operates on a client computer 114 and communicates over a network 110. For example, the network 110 may be the Internet, and the communication client application 112 may be a text chat application, such as IBM Lotus SameTime™, Microsoft Messenger™, Pidgin™, or another instant messaging application. In an alternative embodiment, the network 110 may be an intranet.

The request manager 104, in one embodiment, receives a request for communication with the user from a requester. The request for communication may be a request to contact the user using the user communication server 102. The request for communication may be any type of request for communication including, but not limited to, sending an e-mail, requesting a chat session, requesting a meeting, and a phone call.

In certain embodiments, the request manager 104 evaluates the request for communication against a condition. In response to satisfaction of the condition, the request manager 104 passes the request for communication to the user communication server 102. The request manager 104, in certain embodiments, denies the request for communication in response the condition not being satisfied.

The condition manager 106, in one embodiment, manages one or more conditions relating to the busyness of the user. The conditions managed by the condition manager 106 may include threshold levels for one or more communication activities. For example, one condition may be that the number of active chat sessions open for the user is less than three.

In certain embodiments, the condition managed by the condition manager 106 may be a complex condition that includes multiple criteria. For example, the condition may be that the number of active chat session is less than three and that the number of unread e-mails is less than ten. In order for the condition to be satisfied in this example, all of the criteria in the condition must be satisfied.

In some embodiments, the condition managed by the condition manager 106 is controlled by the requester. For example, the requestor may send a request for communication to the request manager 104 and a condition to the condition manager 106. In this example, the request is passed to the user communication server 102 by the request manager 104 in response to satisfaction of the condition submitted to the condition manager 106.

The busyness reporter 108, in certain embodiments, monitors the level of activity by the user in certain communications related tasks. The busyness reporter 108 may be in communication with the user communication server 102. For example, the busyness reporter 108 may request the number of active chat sessions for the user from the user communication server 102. In another example, the user communication server 102 may report the number of unread e-mail messages for the user to the busyness reporter 108. In one embodiment, the user communication server 102 provides a report of pending contact related tasks to the busyness reporter 108.

Figure 2:
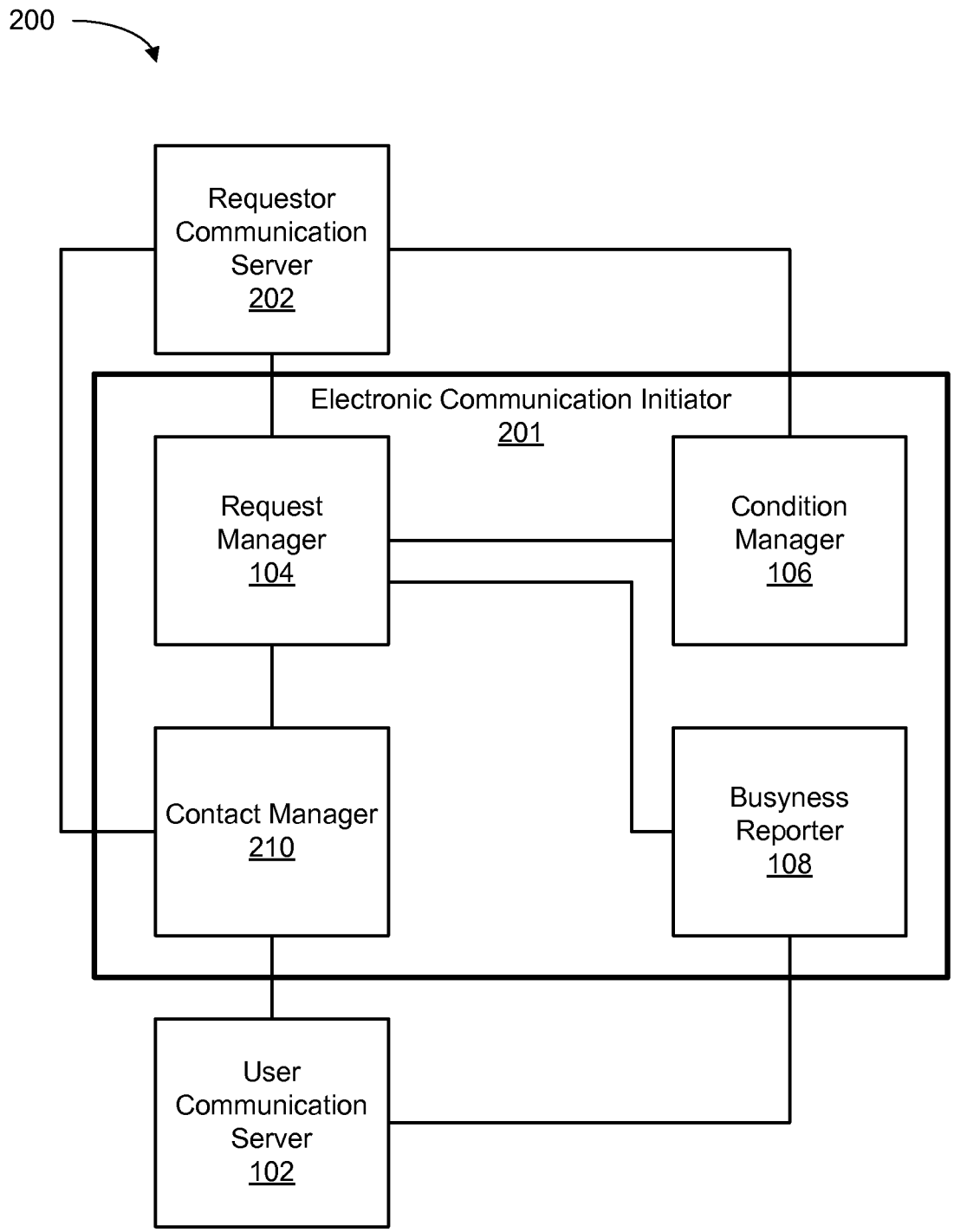
FIG. 2 depicts a schematic diagram of another embodiment of a system for electronic communication initiation contingent on busyness.

FIG. 2 depicts a schematic diagram of another embodiment of a system 200 for electronic communication initiation contingent on busyness. The system 200 includes a requestor communication server 202, an electronic communication initiator 201, and a user communication server 102. The system 200 initiates an electronic communication in response to a condition being satisfied.

The electronic communication initiator 201 includes the request manager 104, the condition manager 106, the contact manager 210, and the busyness reporter 108. The electronic communication initiator 201 initiates electronic communication in response to a busyness of the user satisfying a condition submitted by the requestor.

The request manager 104, in one embodiment, receives a request for electronic communication from a requester communication server 202. The requester communication server 202 corresponds to a requester user who wants to initiate an electronic communication with another user. In this embodiment, the request manager 104 accesses the condition manager 106 to retrieve the condition. The request manager 104, in one embodiment, passes the request for electronic communication to the contact manager 210 in response to satisfaction of the condition. The request manager 104, in certain embodiments, denies the request for electronic communication if to the condition is not satisfied.

The condition manager 106, in one embodiment, receives a condition from the requester communication server 202. The condition, in certain embodiments, is a threshold level for each of one or more communication related activities for the user. The condition may also include status criteria for one or more communication related activities. For example, the condition may include a status criterion that the user has a text chat status of "available."

In certain embodiments, the condition managed by the condition manager 106 may include a plurality of conditions. For example, the requester may submit a condition to the condition manager 106 including criteria that the user have a text chat status of available, not have a meeting starting within 15 minutes, have fewer than five open chat windows, have fewer than 50 unread e-mails, and have fewer than five unread e-mails marked urgent. In this example, all of the criteria of the condition must be satisfied for the condition to be satisfied.

The busyness reporter 108 reports communication related activities for the user. The request manager 104 accesses the busyness reporter 108 to determine the level of communication activity and communication statuses for the user. Using the report from the busyness reporter 108, the request manager 104 evaluates whether the condition is satisfied.

The contact manager 210, in certain embodiments, is coupled to the request manager 104 and passes the request for communication to the user communication server 102 in response to satisfaction of the condition. In one embodiment, the contact manager 210 communicates with the requester communication server 202 in response to the condition not being satisfied. In particular, the contact manager 210 may communicate to the requester communication server 202 that the request for communication has not been delivered to the user. For example, in response to an e-mail, when a condition is not satisfied due to the user having too many unopened e-mails, the contact manager 210 may generate a reply e-mail stating the condition, that the condition is not satisfied, the number of unread e-mails for the user, and/or that the e-mail has not been delivered.

Figure 3:
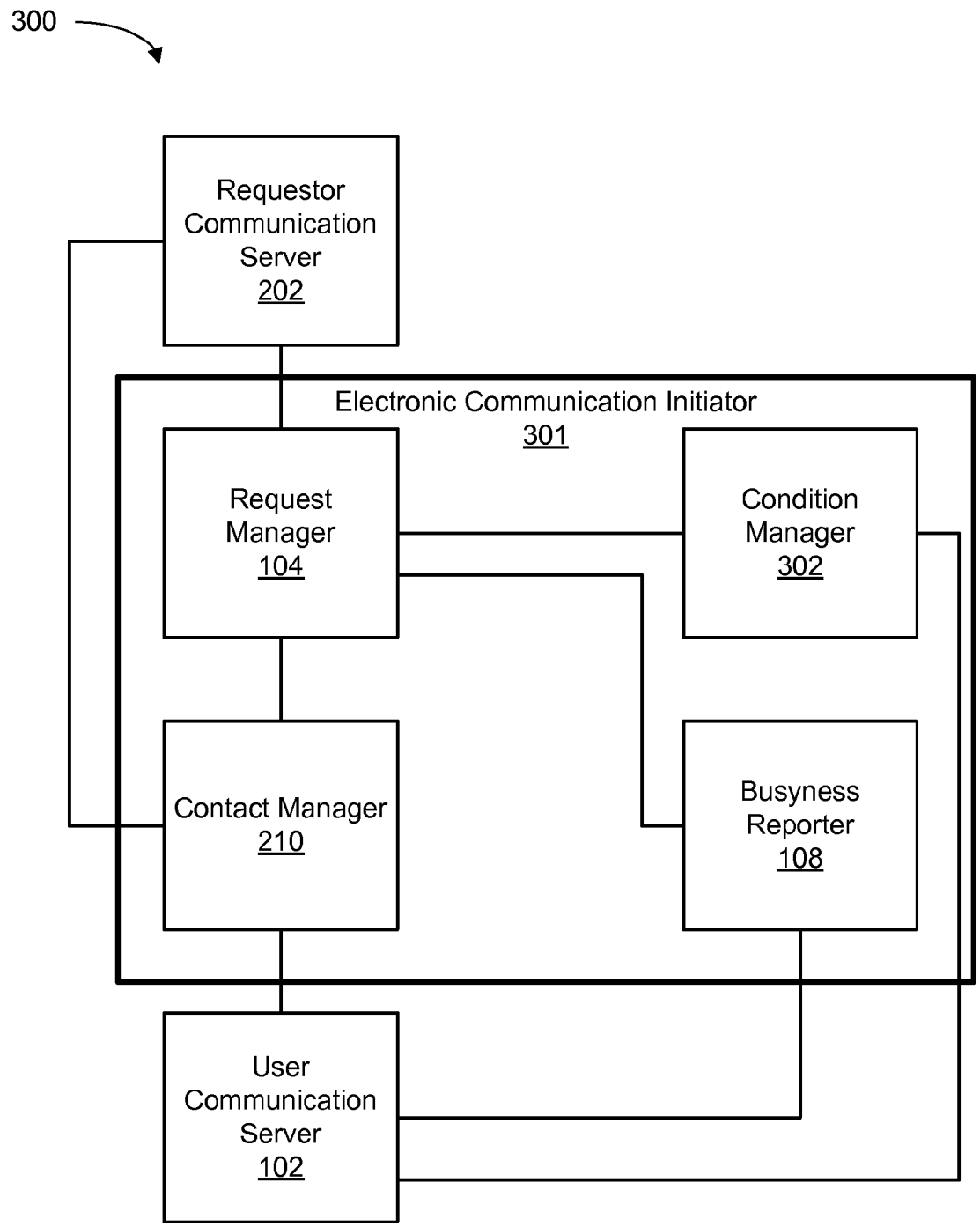
FIG. 3 depicts a schematic diagram of another embodiment of a system for electronic communication initiation contingent on busyness.

FIG. 3 depicts a schematic diagram of another embodiment of a system 300 for electronic communication initiation contingent on busyness. The system 300 includes a requester communication server 202, an electronic communication initiator 301, and the user communication server 102. The system 300 initiates an electronic communication in response to a condition being satisfied.

The electronic communication initiator 301 includes the request manager 104, a condition manager 302, the contact manager 210, and the busyness reporter 108. The request manager 104, the contact manager 210, and the busyness reporter 108 are configured in a similar manner to same numbered elements described in relation to FIG. 2. The electronic communication initiator 301 initiates electronic communication in response to a busyness of a user satisfying a condition submitted by the user.

The condition manager 302, in certain embodiments, receives the condition from the user communication server 102. The condition, in certain embodiments, is a threshold level for each of one or more communication related activities for the user. The condition may also include status criteria for one or more communication related activities. For example, the condition may include a status criterion that the user has a text chat status of "available."

In certain embodiments, the condition managed by the condition manager 302 may include a plurality of conditions. For example, the requester may submit a condition to the condition manager 302 including criteria that the user have a text chat status of available, not have a meeting starting within 15 minutes, have fewer than five open chat windows, have fewer than 50 unread e-mails, and have fewer than five unread e-mails marked urgent. In this example, all of the criteria of the condition must be satisfied for the condition to be satisfied.

Figure 4:
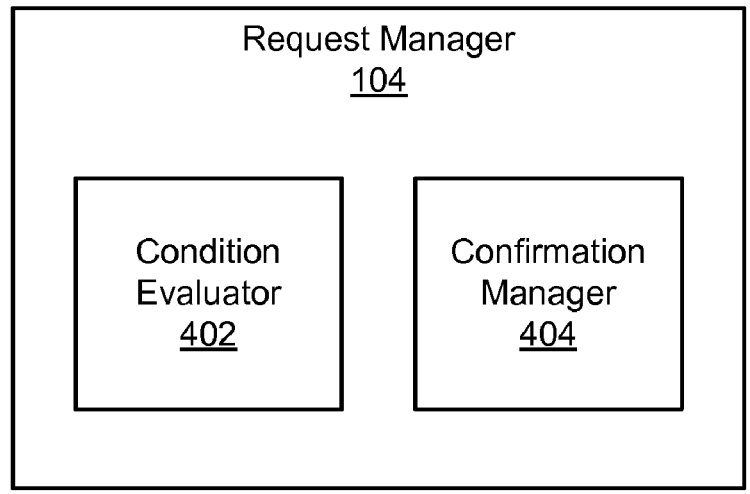
FIG. 4 depicts a schematic diagram of one embodiment of the request manager of FIG. 2.

FIG. 4 depicts a schematic diagram of one embodiment of the request manager 104 of FIG. 2. The request manager 104 includes a condition evaluator 402 and a confirmation manager 404. The request manager 104, in one embodiment, evaluates whether a condition is satisfied.

The condition evaluator 402, in some embodiments, evaluates whether one or more criteria of the condition are satisfied. The condition may be any combination of one or more threshold levels for activities relating to busyness for a user, one or more statuses for the user, such as "available," or other criteria. The condition evaluator 402 compares a condition provided by the condition manager 106 to a busyness reported by the busyness reporter 108 and evaluates whether the condition is satisfied.

In one embodiment, the confirmation manager 404 directs the contact manager 210 to request a confirmation from the requester in response to the condition not being satisfied. The request manager 104 may pass a request for communication to the user in response to receiving a confirmation to the confirmation request in spite of the condition not being satisfied. For example, the confirmation manager 404 may direct the contact manager 210 to request a confirmation from the requester in response to the user having too many open chat windows, thus failing to satisfy a condition. The user in this example may respond with a confirmation, causing the request manager 104 to direct the contact manager 210 to pass the request for communication to the user communication server 102.

Figure 5:
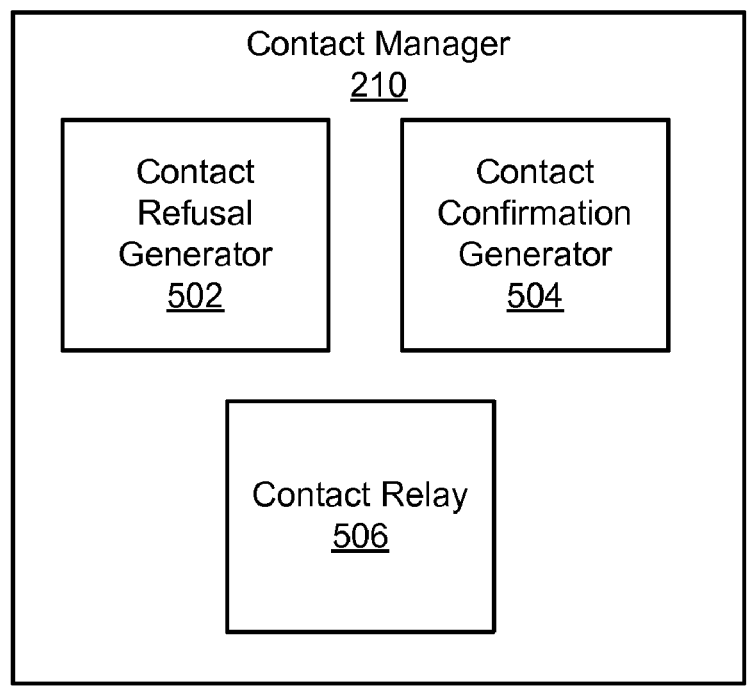
FIG. 5 depicts a schematic diagram of one embodiment of the contact manager of FIG. 2.

FIG. 5 depicts a schematic diagram of the contact manager 210 of FIG. 2. The contact manager 210, in the illustrated embodiment, includes a contact refusal generator 502, a contact confirmation generator 504, and a contact relay 506. The contact manager 210 relays requests for communication to the user communication server 102 and communicates contact refusals and contact confirmation requests to the requestor communication server 202.

To contact refusal generator 502, in one embodiment, generates a contact refusal notice to be communicated to the requestor indicating that a request for communication has been refused. In one embodiment, the contact refusal generator 502 generates the contact refusal notice in response to the condition not being satisfied. The contact refusal notice, in one embodiment, is delivered using the same type of communication service in which the requestor and submitted the request. For example, the contact refusal generator 502 may generate an e-mail indicating that the contact has been refused in response to an e-mail addressed to the user from the requester.

The contact confirmation generator 504, in certain embodiments, generates a request for confirmation. The request for confirmation, in one embodiment, directs the requestor communication server 202 to prompt the requestor for a confirmation. The request for confirmation may be generated in response to the condition not being satisfied. In certain embodiments, the request for confirmation is sent to the requestor using the same type of communication service used for the request for communication. For example, a refused text chat request may result in a request for confirmation in the form of a text chat that is sent to the requester.

In the illustrated embodiment, the contact relay 506 relays a request for communication from the requestor communication server 202 to the user communication server 102. The contact relay 506 relays a request for communication in response to a direction from the request manager 104, in one embodiment. For example, when the condition is satisfied, the request manager 104 directs the contact relay 506 to relay the request for electronic communication to the user communication server 102.

Figure 6:
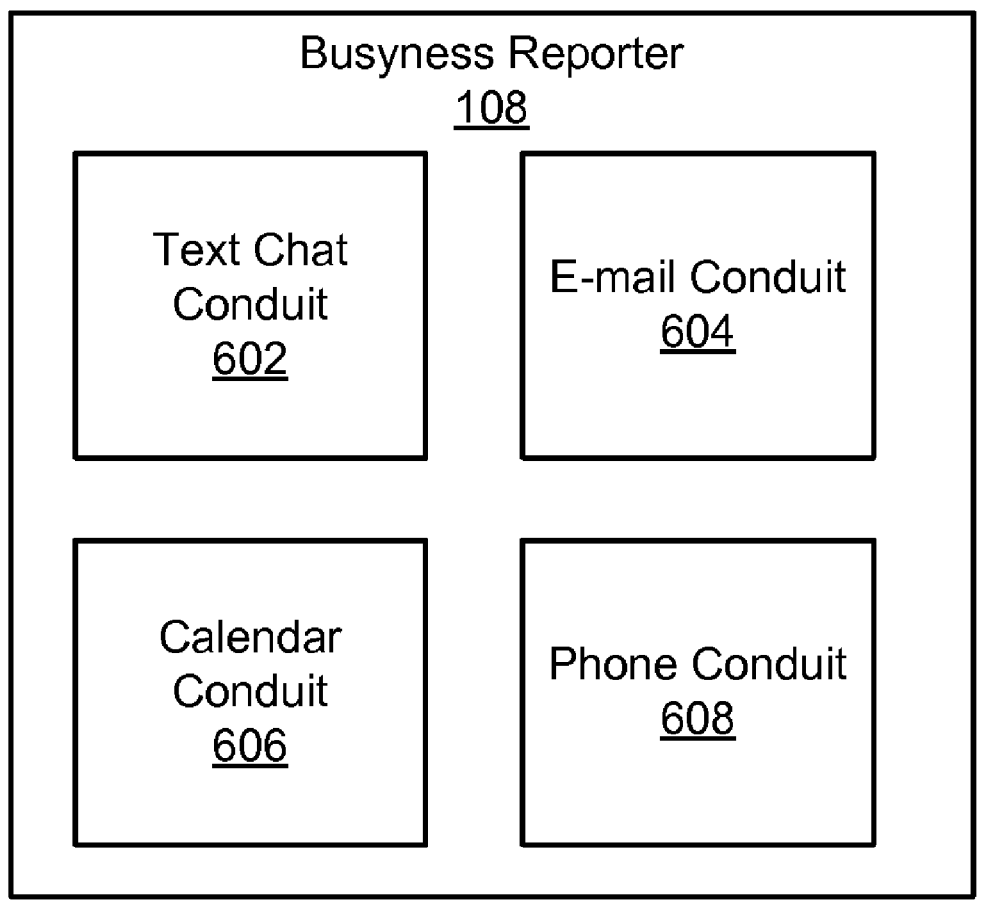
FIG. 6 depicts a schematic diagram of one embodiment of the busyness reporter of FIG. 2.

FIG. 6 depicts a schematic diagram of one embodiment of the busyness reporter 108 of FIG. 2. In the illustrated embodiment, the busyness reporter 108 includes a text chat conduit 602, an e-mail conduit 604, a calendar conduit 606, and a phone conduit 608. Other embodiments of the busyness reporter 108 may include fewer or more conduits, including conduits for other types of electronic communication modes. The busyness reporter 108 reports a busyness of a user.

The text chat conduit 602, in one embodiment, communicates with a text chat server (not shown). The text chat conduit 602 may receive information from the text chat server indicating a level of busyness of the user in relation to text chat activity. For example, the text chat conduit 602 may retrieve information from an instant messaging server indicating the availability of a user (e.g. "available," "busy," etc.) and one or more metrics indicating a level of busyness, such as a number of open chat windows.

The text chat conduit 602, in certain embodiments, communicates with a text chat client (not shown) of the user. For example, the text chat conduit 602 may be computer code associated with a text chat client operating on the user's computer 114. In this example, in the computer code causes the user's computer 114 to monitor information indicating the level of busyness of the user relating to text chat and communicate the information to the text chat conduit 602.

In one embodiment, the e-mail conduit 604 communicates with an e-mail server (not shown). The e-mail conduit 604 may receive information from the e-mail server indicating the level of busyness of the user in relation to e-mail. For example, the e-mail conduit 604 may retrieve metrics from the e-mail server indicating the busyness of the user, such as a number of unread e-mail messages, a number of draft e-mails, or a number of e-mails marked with a priority.

In certain embodiments, the e-mail conduit 604 communicates with an e-mail client (not shown) to retrieve information indicating the level of busyness of the user. For example, the e-mail conduit 604 may communicate with Microsoft Outlook™ to determine the number of unread e-mail messages or other busyness metrics.

The calendar conduit 606, in one embodiment, communicates with a calendar server (not shown). The calendar conduit 606 may receive information from the calendar server indicating the level of busyness of the user in relation to a calendar. For example, the calendar conduit 606 may retrieve metrics from the calendar server indicating the busyness of the user, such as a pending or current meeting, a busyness status based on a calendar event, or a number of upcoming meetings for a time period.

In certain embodiments, the calendar conduit 606 communicates with a calendar client (not shown) to retrieve information indicating the level of busyness of the user. For example, the calendar conduit 606 may communicate with Microsoft Outlook™ to determine a current busyness status, such as "busy."

The phone conduit 608, in one embodiment, communicates with a phone server (not shown). The phone conduit 608 may receive information from the phone server indicating the level of busyness of the user in relation to telephone communication. For example, the phone conduit 608 may retrieve metrics from the phone server indicating the busyness of the user, such as a current phone conversation, queued phone calls, or a number voice mail messages.

In certain embodiments, the phone conduit 608 communicates with a phone client to retrieve information indicating the level of busyness of the user. For example, the phone conduit 608 may communicate with a network-enabled telephone to determine a number of voice mail messages waiting for the user.

Figure 7:
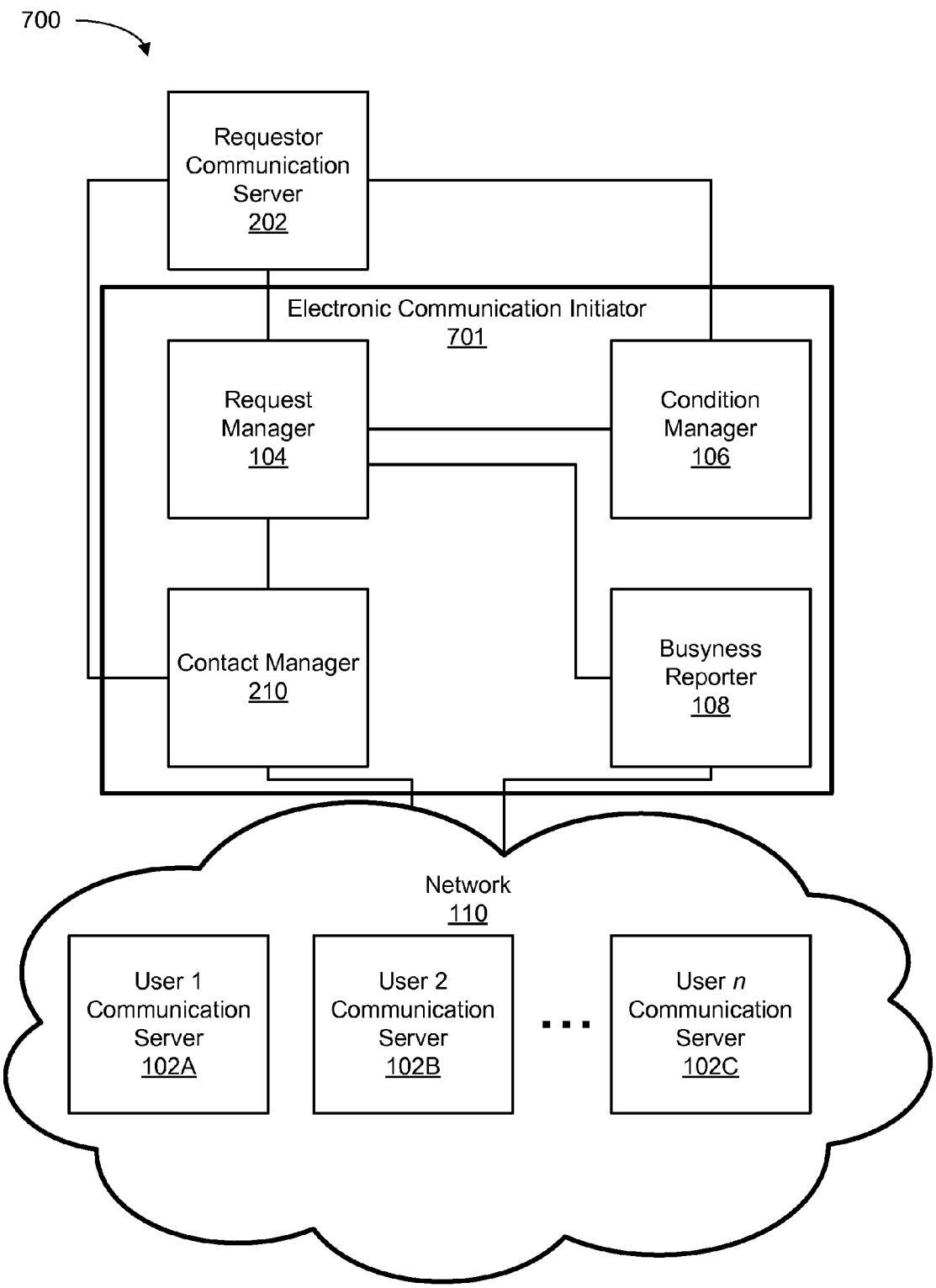
FIG. 7 depicts a schematic diagram of another embodiment of a system for electronic communication initiation contingent on busyness.

FIG. 7 depicts a schematic diagram of another embodiment of a system 700 for electronic communication initiation contingent on busyness. The system 700 includes a requester communication server 202, an electronic communication initiator 701, and a plurality of user communication servers 102A-102C. The system 700 initiates an electronic communication between a requester and one or more users in response to the condition being satisfied.

The electronic communication initiator 701, in the illustrated embodiment, includes the request manager 104, the condition manager 106, the contact manager 210, and the busyness reporter 108. The request manager 104, the contact manager 210, and the busyness reporter 108 are configured in a similar manner to same numbered elements described in relation to FIG. 2. The electronic communication initiator 701 initiates electronic communication in response to a busyness of one or more users satisfying a condition submitted by the requester.

In the illustrated embodiment, the request manager 104 receives a request for electronic communication between a requestor and a plurality of users. The request manager 104, in one embodiment, relays the request for communication to all of the users in response to each of the plurality of users satisfying a condition retrieved from the condition manager 106. In an alternative embodiment, the request manager 104 relays the request for communication to the users for whom the condition is satisfied and denies the request for communication to the users for whom the condition is not satisfied.

The condition manager 106, in one embodiment, receives a single condition or set of conditions that apply to all of the users. In another embodiment, the condition manager 106 receives a condition or set of conditions for each of the individual users.

In the illustrated embodiment the condition manager 106 receives conditions from the requestor through the requestor communication server 202. In an alternative embodiment, the condition manager 106 receives conditions from one or more user communication servers 102A-102C. In this embodiment, each individual user may determine the conditions that cause requests for communications to be denied.

Figure 8:
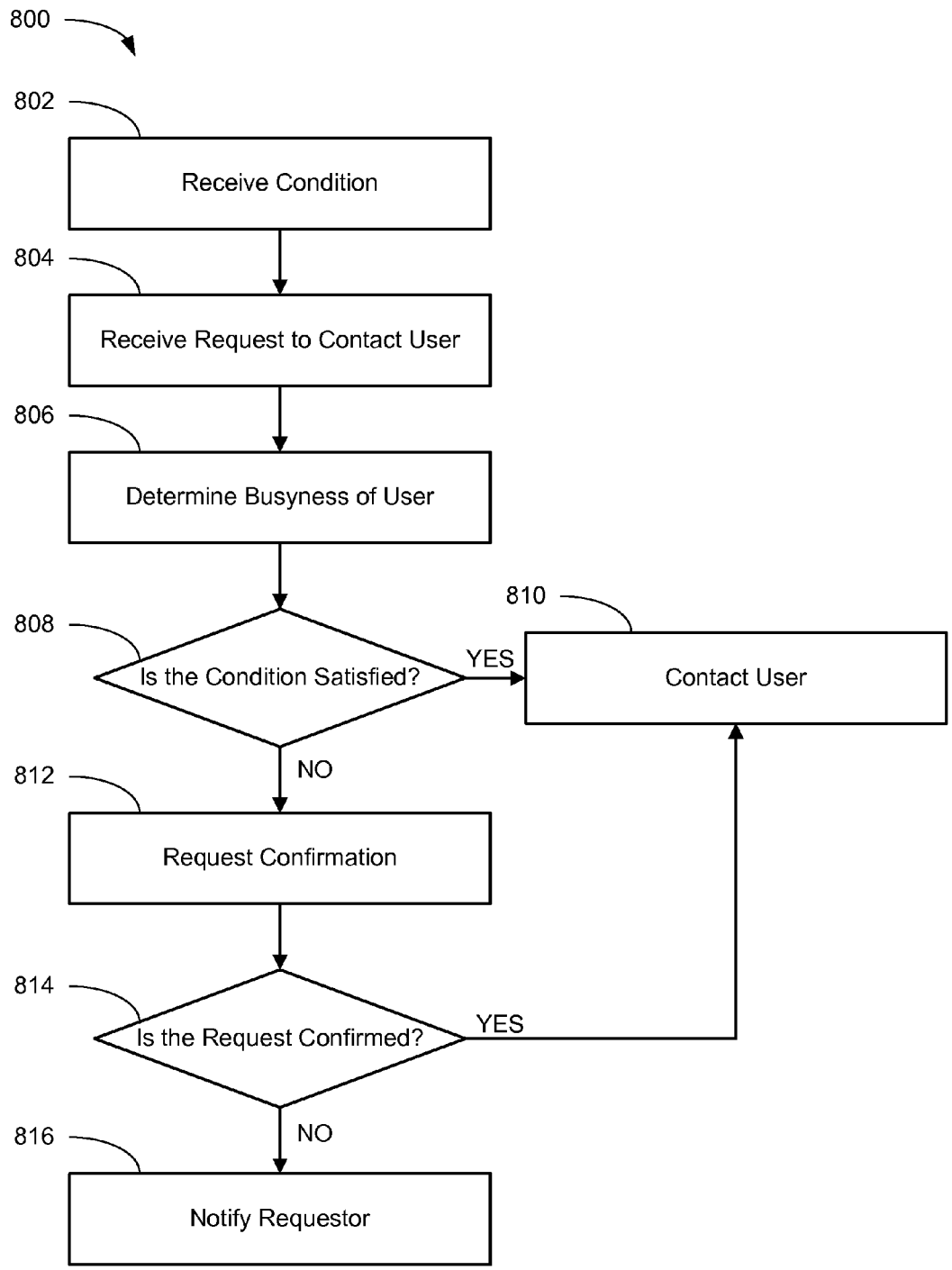
FIG. 8 depicts a flow chart diagram of one embodiment of a method for electronic communication initiation contingent on busyness.

FIG. 8 depicts a flow chart diagram of one embodiment of a method 800 for electronic communication initiation contingent on busyness. The method 800 is, in certain embodiments, a method of use of the systems and apparatuses of FIGS. 1-7, and is described with reference to those figures. Nevertheless, the method 800 may also be conducted independently thereof and is not intended to be limited to the specific embodiments discussed above with respect to those figures.

As shown in FIG. 8, the condition manager 106 receives 802 a condition. The condition indicates a threshold level of busyness which must be satisfied in order for a request for communication to be delivered. In general, the condition is satisfied if the level of busyness is below the threshold. In some embodiments, the condition manager 106 receives 802 the condition from the requester. In an alternative embodiment, the condition manager 106 receives 802 the condition from the user.

The request manager 104 receives 804 a request to contact the user. The request may be in the form of any type of electronic communication including an e-mail, a request to initiate text chat, a telephone call, a request for a voice chat, a calendaring request, or another electronic communication.

The request manager 104 determines 806 the busyness of the user by retrieving busyness metrics for the user from the busyness reporter 108. Busyness metrics include electronic activity related tasks, such as open text chats, availability settings, unopened e-mail, and other electronic activity related tasks.

The request manager 104 determines 808 if the condition is satisfied by comparing the busyness metrics provided by the busyness reporter 108 to the condition provided by the condition manager 106. The request manager 104 directs the contact manager 210 to contact 810 the user in response to satisfaction of the condition.

In certain embodiments, the request manager 104 monitors the busyness of the user in response to the condition not being satisfied. The request manager 104, in one embodiment, directs the contact manager 210 to contact the requester in response to the condition being satisfied at a future time.

In some embodiments, the requester may configure the request manager 104 for the amount of time to monitor the busyness of the user. For example, the request manager 104 may be configured to monitor the busyness of the user for an hour. In another embodiment, the request manager 104 may be configured to cease monitoring the busyness of the user in response to an event, such as the requester logging off.

The request manager 104, in one embodiment, directs the contact manager 210 to request 812 a confirmation from the requester in response to the condition not being satisfied. The request 812 for confirmation may take the form of any type of electronic communication including e-mail, text chat, generated or recorded speech, or a message displayed by a requester communication server 202.

In an alternative embodiment, the request manager 104 notifies the requester that the condition is not satisfied and that the request for communication has not been delivered to the user. In yet another embodiment, the request manager 104 retains the request for communication and monitors the busyness of the user. In this embodiment, the request manager 104 directs the contact manager 210 to contact 800 the user in response to satisfaction of the condition at some future time.

The request manager 104 also determines 814 if the request is confirmed. The request manager 104 directs the contact manager 210 to contact 810 the user in response to determining 814 that the request is confirmed. The request manager 104 notifies 816 the requester that the condition is not satisfied and that the request for communication has not been delivered to the user in response to the condition not being satisfied.

The various embodiments allow a communication service user to contact a user at a time when the user is not too busy to respond. By determining the busyness of the user based on a plurality of busyness metrics, embodiments of the apparatus, system, and method allow for complex rules and conditions that provide a more accurate picture actual busyness of the user.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including an operation to receive a request from a requester to contact a user. The requested contact includes a request to engage in electronic communication. The embodiment also includes an operation to determine a busyness of the user. The busyness of the user is determined by accessing a quantity of active contact related tasks for the user. Additionally, the computer program product includes an operation to compare the busyness of the user to a condition. The condition may be a threshold level for a contact related task. Alternatively, the condition may be a complex condition with threshold levels for a plurality of contact related tasks. The computer program product also includes an operation to contact the user in response to satisfaction of the condition.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable storage medium providing program code for use by or in connection with a computer or any instruction execution system. For the purposes of this description, a computer-usable or computer readable storage medium can be any apparatus that can store the program for use by or in connection with the instruction execution system, apparatus, or device.

The computer-useable or computer-readable storage medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

An embodiment of a data processing system suitable for storing and/or executing program code includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product for electronic communication initiation contingent on busyness, the computer program product comprising a non-transitory computer useable storage medium to store a computer readable program, wherein the computer readable program, when executed on a computer, causes the computer to perform operations comprising:
   receive a request from a requestor to contact a user, the requested contact comprising a request to engage in electronic communication;
   determine a busyness of the user, the busyness determined based on a count of a contact related task of the user;
   compare the busyness of the user to a condition comprising a threshold level for a contact related task, wherein the threshold level is a threshold of a level of busyness; and
   notify the requestor in response to the condition not being satisfied.

2. The computer program product of claim 1, wherein the condition comprises a complex condition with threshold levels for a plurality of contact related tasks.

3. The computer program product of claim 2, wherein the computer readable program, when executed on the computer, causes the computer to perform an operation to receive the threshold levels for each of the plurality of contact related tasks from the requestor.

4. The computer program product of claim 2, wherein the computer readable program, when executed on the computer, causes the computer to perform an operation to receive the threshold levels for each of the plurality of contact related tasks from the user.

5. The computer program product of claim 1, wherein the plurality of contact related tasks comprises a combination of at least two of a text chat, an e-mail, a calendaring request, or a voice chat.

6. The computer program product of claim 1, wherein the computer readable program, when executed on the computer, causes the computer to perform an operation to monitor the busyness of the user in response to the condition not being satisfied.

7. The computer program product of claim 6, wherein the computer readable program, when executed on the computer, causes the computer to perform an operation to contact the user in response a determination that the monitored busyness of the user satisfies the condition.

8. The computer program product of claim 1, wherein the request from the requestor comprises a conditional request.

9. A method for electronic communication initiation contingent on busyness, the method comprising:

receiving a request from a requestor to contact a user via an electronic communication device, the requested contact comprising a request to engage in electronic communication;

determining a busyness of the user, the busyness determined based on counts of contact related tasks of the user;

comparing the busyness of the user to a condition comprising a complex condition having threshold levels for a plurality of contact related tasks, wherein each of the threshold levels is a threshold of a level of busyness;

reporting the busyness of the user to the requestor; and contacting the user in response to satisfaction of the condition.

10. The method of claim 9, further comprising:

receiving a group request to contact a plurality of users;

determining the busyness of each of the plurality of users; and contacting each of the plurality of users in response to satisfaction of the condition for each of the plurality of users.

11. The method of claim 9, wherein the condition for each of the plurality of users is unique to each corresponding user.

12. The method of claim 9, further comprising:

receiving a group request to contact a plurality of users;

determining the busyness of each of the plurality of users; and contacting less than all of the users in response to satisfaction of the condition for the corresponding less than all of the users.

13. The method of claim 9, further comprising reporting the busyness of the user to the requestor in response to receiving the request to contact the user.

14. The method of claim 9, further comprising reporting the busyness of the user to the requestor in response to the condition not being satisfied.

15. An apparatus for electronic communication initiation contingent on busyness, the apparatus comprising:

a request manager to receive a conditional request from a requestor communication server to contact a user based on satisfaction of a complex condition comprising threshold levels for a plurality of contact related tasks, wherein each of the threshold levels is a threshold of a level of busyness; and a contact manager coupled to the request manager, the contact manager to report the busyness of the user to the requestor and to contact the user in response to satisfaction of the complex condition relative to a busyness of the user, wherein the busyness of the user is indicative of current communication activity levels of the user for the plurality of contact related tasks, wherein the busyness is determined based on counts of the contact related tasks of the user.

16. The apparatus of claim 15, wherein the request manager comprises a condition evaluator to compare the busyness of the user to the complex condition and to generate an indication of availability of the user, wherein the indication of availability comprises a current availability status and a metric of at least one of the plurality of contact related tasks.

17. The apparatus of claim 16, wherein request manager further comprises a confirmation manager coupled to the condition evaluator, the confirmation manager to notify the requestor communication server in response to a determination that the complex condition is not satisfied and to request confirmation of receipt of the notification.

18. The apparatus of claim 15, wherein the contact manager comprises a contact refusal generator to generate a contact refusal notice for communication to the requestor communication server in response to refusal of the conditional request to contact the user.

19. The apparatus of claim 18, wherein the contact manager further comprises a contact confirmation generator coupled to the contact refusal generator, the contact confirmation generator to generate a request for confirmation from the requestor communication server of receipt of the contact refusal notice.

20. The apparatus of claim 15, wherein the contact manager further comprises a contact relay to send a contact request to the user in response to the satisfaction of the complex condition relative to the busyness of the user.

* * * * *